US012718737B2

(12) United States Patent
Kim et al.

(10) Patent No.: US 12,718,737 B2
(45) Date of Patent: Aug. 25, 2026

(54) GATE DRIVER, DISPLAY DEVICE INCLUDING THE GATE DRIVER, AND ELECTRONIC DEVICE INCLUDING THE DISPLAY DEVICE

(71) Applicant: Samsung Display Co., Ltd., Yongin-Si (KR)

(72) Inventors: Hyeongseok Kim, Yongin-si (KR); Byungchang Yu, Yongin-si (KR); Yunmi Kim, Yongin-si (KR); Doyeong Park, Yongin-si (KR); Dong Hee Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/214,040

(22) Filed: May 21, 2025

(65) Prior Publication Data

US 2026/0073832 A1 Mar. 12, 2026

(30) Foreign Application Priority Data

Sep. 6, 2024 (KR) ........................ 10-2024-0121545

(51) Int. Cl.
*G09G 3/20* (2006.01)

(52) U.S. Cl.
CPC ... *G09G 3/2092* (2013.01); *G09G 2310/0267* (2013.01); *G09G 2310/0275* (2013.01); *G09G 2310/08* (2013.01)

(58) Field of Classification Search
CPC ......... G09G 3/2092; G09G 2310/0267; G09G 2310/0275; G09G 2310/08
See application file for complete search history.

(56) References Cited

U.S. PATENT DOCUMENTS

| | | | | |
|---|---|---|---|---|
| 7,414,599 B2 | | 8/2008 | Chung et al. | |
| 2021/0201770 | A1* | 7/2021 | Park | G09G 3/32 |
| 2022/0208109 | A1* | 6/2022 | Seo | G09G 3/3233 |
| 2023/0214037 | A1* | 7/2023 | Hwang | G06F 3/04184 345/174 |
| 2023/0215378 | A1* | 7/2023 | Choi | G09G 3/3233 345/204 |
| 2025/0218391 | A1* | 7/2025 | Kim | G09G 3/3291 |
| 2025/0252927 | A1* | 8/2025 | Byun | G09G 3/3233 |

FOREIGN PATENT DOCUMENTS

KR 10-0560780 B1 3/2006

* cited by examiner

*Primary Examiner* — Benjamin C Lee
*Assistant Examiner* — Sarvesh J Nadkarni
(74) *Attorney, Agent, or Firm* — Innovation Counsel LLP

(57) ABSTRACT

A carry output circuit includes a carry variable on transistor, a thirteenth transistor, a fourteenth transistor, and a carry boost capacitor, wherein the carry variable on transistor includes a gate electrode connected to a CQS node, a first electrode connected to a CQ node, and a second electrode connected to a carry Q node, the thirteenth transistor includes a gate electrode connected to a carry Q node, a first electrode receiving the carry clock signal, and a second electrode connected to a carry node, the fourteenth transistor includes a gate electrode connected to the QB node, a first electrode receiving the second low gate voltage, and a second electrode connected to the carry node, and the carry boost capacitor includes a first electrode connected to the carry Q node and a second electrode connected to the carry node.

20 Claims, 10 Drawing Sheets

DU3

DU5

GATE DRIVER, DISPLAY DEVICE INCLUDING THE GATE DRIVER, AND ELECTRONIC DEVICE INCLUDING THE DISPLAY DEVICE

This application claims priority under 35 USC § 119 to Korean Patent Application No. 10-2024-0121545 filed on Sep. 6, 2024, in the Korean Intellectual Property Office (KIPO), the entire disclosure of which is incorporated by reference herein.

BACKGROUND

1. Field

Embodiments of the present inventive concept relates to a gate driver, a display device including the gate driver, and an electronic device including the display device. More particularly, the present inventive concept relates to a gate driver, a display device including the gate driver, and an electronic device including the display device for supporting a DLG (Dual Line Gate) mode.

2. Description of the Related Art

Recently, a display device supporting a DLG (Dual Line Gate) mode has been developed. The DLG mode refers to a mode which increases a driving frequency of the display device by using a method of simultaneously driving two consecutive gate lines. For example, when the display device supports up to 60 Hz, the display device may support up to 120 Hz by using the DLG mode.

However, as described above, since the DLG mode adopts the method of simultaneously driving the two consecutive gate lines, a period of an activation pulse of a gate signal and a period of an activation pulse of a carry signal decrease by half. Therefore, a voltage of a gate electrode of a transistor outputting the gate signal and a voltage of a gate electrode of a transistor outputting the carry signal may not be sufficiently charged, and a reliability of the gate signal and the carry signal may decrease. A display quality of the display device supporting the DLG mode may decrease.

SUMMARY

Embodiments of the present inventive concept provide a gate driver for supporting a DLG mode to improve a display quality of a display device.

Embodiments of the present inventive concept provide a display device including the gate driver.

Embodiments of the present inventive concept provide an electronic device including the display device.

In an embodiment of a gate driver according to the present inventive concept, the gate driver includes a plurality of stages. Each of the stages comprises a CQ node charging circuit configured to provide a previous carry signal and a second high gate voltage to a CQ node in response to the previous carry signal, a first CQS node charging circuit configured to provide the second high gate voltage to a CQS node in response to the previous carry signal, a second CQS node charging circuit configured to provide a first high gate voltage to the CQS node in response to a voltage of a boosting node, a QB node control circuit configured to invert a voltage of the CQ node and to provide the inverted voltage of the CQ node to the QB node, a CQ node boosting circuit configured to provide a boosting clock signal to the boosting node in response to the voltage of the CQ node and to provide a second low gate voltage to the boosting node in response to a voltage of the QB node, and a carry output circuit configured to provide a carry clock signal as the carry signal to a carry node in response to the voltage of the CQ node, and to provide a second low gate voltage as the carry signal to the carry node in response to the voltage of the QB node. The carry output circuit comprises a carry variable on transistor including a gate electrode connected to the CQS node, a first electrode connected to the CQ node, and a second electrode connected to a carry Q node, a thirteenth transistor including a gate electrode connected to the carry Q node, a first electrode receiving the carry clock signal, and a second electrode connected to the carry node, a fourteenth transistor including a gate electrode connected to the QB node, a first electrode receiving the second low gate voltage, and a second electrode connected to the carry node, and a carry boost capacitor including a first electrode connected to the carry Q node and a second electrode connected to the carry node.

In an embodiment, the carry variable on transistor may be turned off when a voltage of the carry Q node is boosted by the carry boost capacitor.

In an embodiment, the gate driver may be configured to support a DLG (Dual Line Gate) mode, and a period of an activation pulse of the carry clock signal may decrease while the gate driver is configured to perform the DLG mode.

In an embodiment, the CQ node charging circuit may comprise a first-first transistor including a gate electrode receiving the previous carry signal, a first electrode receiving the previous carry signal, and a second electrode receiving the second high gate voltage, and a first-second transistor including a gate electrode receiving the previous carry signal, a first electrode receiving the second high gate voltage, and a second electrode connected to the CQ node.

In an embodiment, the first CQS node charging circuit may comprise a fourth transistor including a gate electrode receiving the previous carry signal, a first electrode receiving the second high gate voltage, and a second electrode connected to the CQS node, and the second CQS node charging circuit may comprise a fifth transistor including a gate electrode receiving the voltage of the boosting node, a first electrode receiving the first high gate voltage, and a second electrode connected to the CQS node.

In an embodiment, the QB node control circuit may comprise a seventh transistor including a gate electrode receiving the first high gate voltage, a first electrode receiving the first high gate voltage, and a second electrode, an eighth transistor including a gate electrode connected to the second electrode of the seventh transistor, a first electrode receiving the first high gate voltage, and a second electrode connected to the QB node, a ninth transistor including a gate electrode connected to the CQ node, a first electrode receiving a first low gate voltage, and a second electrode connected to the second electrode of the seventh transistor and the gate electrode of the eighth transistor, and a tenth transistor including a gate electrode connected to the CQ node, a first electrode receiving the second low gate voltage, and a second electrode connected to the QB node.

In an embodiment, the CQ node boosting circuit may comprise an eleventh transistor including a gate electrode connected to the CQ node, a first electrode receiving the boosting clock signal, and a second electrode connected to the boosting node, a twelfth transistor including a gate electrode connected to the QB node, a first electrode receiving the second low gate voltage, and a second electrode connected to the boosting node, and a CQ boost capacitor including a first electrode connected to the CQ node and a second electrode connected to the boosting node.

In an embodiment, the each of the stages may further comprise a first gate output circuit configured to provide a first gate clock signal as a first gate signal to a first gate node in response to the voltage of the CQ node, and to provide a first low gate voltage as the first gate signal to the first gate node in response to the voltage of the QB node, and a second gate output circuit configured to provide a second gate clock signal as a second gate signal to a second gate node in response to the voltage of the CQ node, and to provide the first low gate voltage as the second gate signal to the second gate node in response to the voltage of the QB node.

In an embodiment, the first gate output circuit may comprise a first gate variable on transistor including a gate electrode connected to the CQS node, a first electrode connected to the CQ node, and a second electrode connected to a first gate Q node, a fifteenth transistor including a gate electrode connected to the first gate Q node, a first electrode receiving the first gate clock signal, and a second electrode connected to the first gate node, a sixteenth transistor including a gate electrode connected to the QB node, a first electrode receiving the first low gate voltage, and a second electrode connected to the first gate node, and a first gate boost capacitor including a first electrode connected to the first gate Q node and a second electrode connected to the boosting node. The second gate output circuit may comprise a second gate variable on transistor including a gate electrode connected to the CQS node, a first electrode connected to the CQ node, and a second electrode connected to a second gate Q node, a seventeenth transistor including a gate electrode connected to the second gate Q node, a first electrode receiving the second gate clock signal, and a second electrode connected to the second gate node, an eighteenth transistor including a gate electrode connected to the QB node, a first electrode receiving the first low gate voltage, and a second electrode connected to the second gate node, and a second gate boost capacitor including a first electrode connected to the second gate Q node and a second electrode connected to the boosting node.

In an embodiment, the each of the stages may further comprises a first CQ node discharging circuit configured to provide the second low gate voltage to the CQ node in response to a next carry signal, and a second CQ node discharging circuit configured to provide the second low gate voltage to the CQ node in response to the voltage of the QB node.

In an embodiment, the first CQ node discharging circuit may comprise a second transistor including a gate electrode receiving the next carry signal, a first electrode receiving the second low gate voltage, and a second electrode connected to the CQ node, and the second CQ node discharging circuit may comprise a third transistor including a gate electrode connected to the QB node, a first electrode receiving the second low gate voltage, and a second electrode connected to the CQ node.

In an embodiment, the each of the stages may further comprise a third CQS node charging circuit configured to provide the first high gate voltage to the CQS node in response to a next carry signal.

In an embodiment, the third CQS node charging circuit may comprise a sixth transistor including a gate electrode receiving the next carry signal, a first electrode receiving the first high gate voltage, and a second electrode connected to the CQS node.

In an embodiment, the each of the stages may further comprise a CQS node discharging circuit configured to provide a first low gate voltage to the CQS node in response to the voltage of the QB node.

In an embodiment, the CQS node discharging circuit may comprise a nineteenth transistor including a gate electrode connected to the QB node, a first electrode receiving the first low gate voltage, and a second electrode connected to the CQS node.

In an embodiment of a display device according to the present inventive concept, the display device comprises a display panel including a pixel, a data driver configured to provide a data voltage to the pixel, a gate driver configured to provide a gate signal to the pixel, and a driving controller configured to control the data driver and the gate driver. The gate driver comprises a plurality of stages. Each of the stages comprises a CQ node charging circuit configured to provide a previous carry signal and a second high gate voltage to a CQ node in response to the previous carry signal, a first CQS node charging circuit configured to provide the second high gate voltage to a CQS node in response to the previous carry signal, a second CQS node charging circuit configured to provide a first high gate voltage to the CQS node in response to a voltage of a boosting node, a QB node control circuit configured to invert a voltage of the CQ node and to provide the inverted voltage of the CQ node to the QB node, a CQ node boosting circuit configured to provide a boosting clock signal to the boosting node in response to the voltage of the CQ node and to provide a second low gate voltage to the boosting node in response to a voltage of the QB node, and a carry output circuit configured to provide a carry clock signal as the carry signal to a carry node in response to the voltage of the CQ node, and to provide a second low gate voltage as the carry signal to the carry node in response to the voltage of the QB node. The carry output circuit comprises a carry variable on transistor including a gate electrode connected to the CQS node, a first electrode connected to the CQ node, and a second electrode connected to a carry Q node, a thirteenth transistor including a gate electrode connected to the carry Q node, a first electrode receiving the carry clock signal, and a second electrode connected to the carry node, a fourteenth transistor including a gate electrode connected to the QB node, a first electrode receiving the second low gate voltage, and a second electrode connected to the carry node, and a carry boost capacitor including a first electrode connected to the carry Q node and a second electrode connected to the carry node.

In an embodiment, the carry variable on transistor may be turned off when a voltage of the carry Q node is boosted by the carry boost capacitor.

In an embodiment, the gate driver may be configured to support a DLG (Dual Line Gate) mode, and a period of an activation pulse of the carry clock signal may decrease while the gate driver is configured to perform the DLG mode.

In an embodiment, the CQ node charging circuit may comprise a first-first transistor including a gate electrode receiving the previous carry signal, a first electrode receiving the previous carry signal, and a second electrode receiving the second high gate voltage, and a first-second transistor including a gate electrode receiving the previous carry signal, a first electrode receiving the second high gate voltage, and a second electrode connected to the CQ node.

In an embodiment of an electronic device according to the present inventive concept, the electronic device comprises a display panel including a pixel, a data driver configured to provide a data voltage to the pixel, a gate driver configured to provide a gate signal to the pixel, a driving controller configured to control the data driver and the gate driver, and a processor configured to control the driving controller. The gate driver comprises a plurality of stages. Each of the stages comprises a CQ node charging circuit configured to provide a previous carry signal and a second high gate voltage to a CQ node in response to the previous carry signal, a first CQS node charging circuit configured to provide the second high gate voltage to a CQS node in response to the previous carry signal, a second CQS node charging circuit configured to provide a first high gate voltage to the CQS node in response to a voltage of a boosting node, a QB node control circuit configured to invert a voltage of the CQ node and to provide the inverted voltage of the CQ node to the QB node, a CQ node boosting circuit configured to provide a boosting clock signal to the boosting node in response to the voltage of the CQ node and to provide a second low gate voltage to the boosting node in response to a voltage of the QB node, and a carry output circuit configured to provide a carry clock signal as the carry signal to a carry node in response to the voltage of the CQ node, and to provide a second low gate voltage as the carry signal to the carry node in response to the voltage of the QB node. The carry output circuit comprises a carry variable on transistor including a gate electrode connected to the CQS node, a first electrode connected to the CQ node, and a second electrode connected to a carry Q node, a thirteenth transistor including a gate electrode connected to the carry Q node, a first electrode receiving the carry clock signal, and a second electrode connected to the carry node, a fourteenth transistor including a gate electrode connected to the QB node, a first electrode receiving the second low gate voltage, and a second electrode connected to the carry node, and a carry boost capacitor including a first electrode connected to the carry Q node and a second electrode connected to the carry node.

According to the gate driver, the display device, and the electronic device, even if the gate driver performs the DLG mode and the period of the activation pulse of the carry clock signal is shortened, the voltage of the carry Q node may be boosted by the carry boost capacitor. In addition, since the carry variable on transistor is turned off, the boosted voltage of the carry Q node may not be affected by the voltage of the CQ node. Accordingly, the display quality may be improved.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
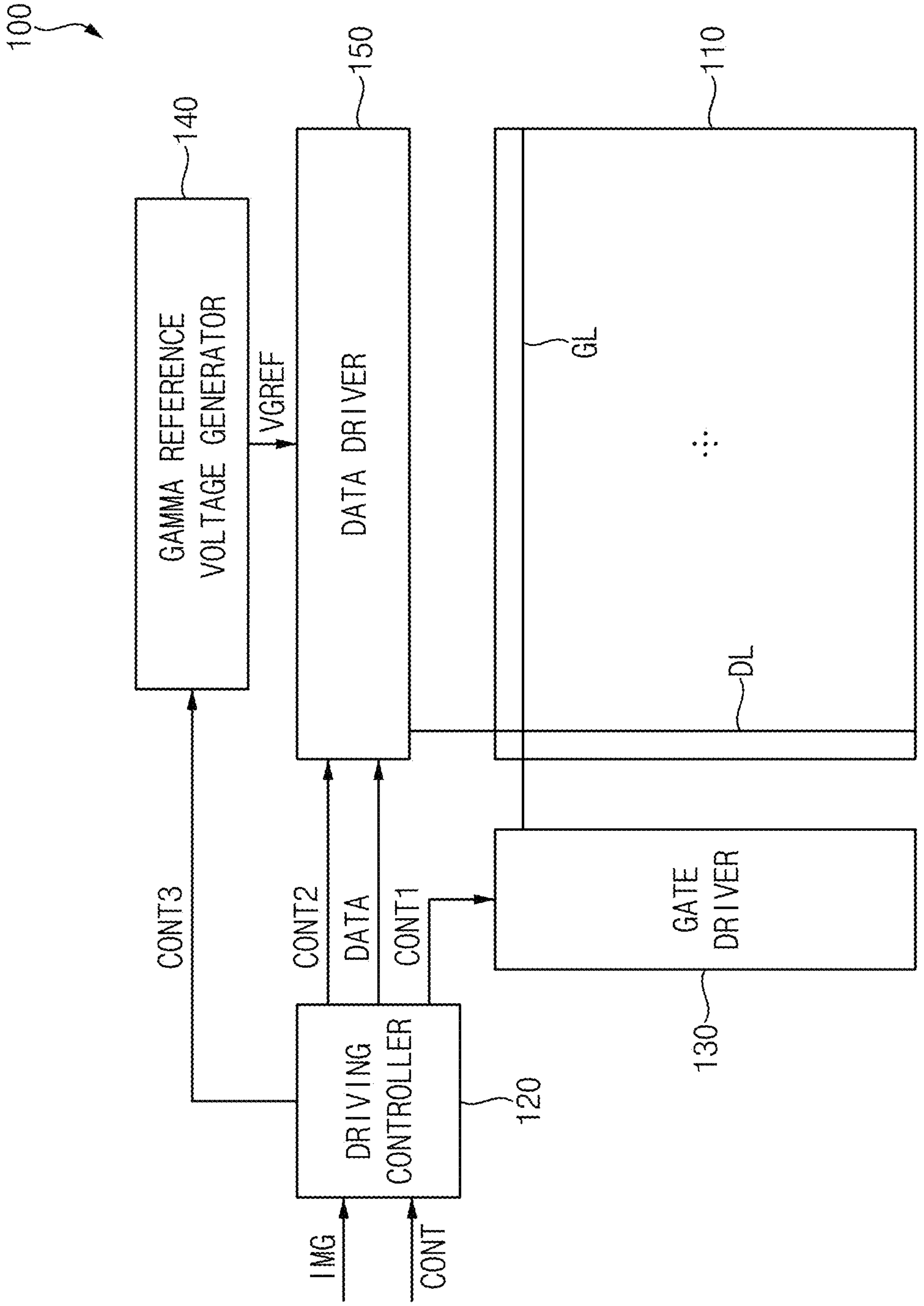
FIG. 1 is a block diagram showing a display device according to embodiments of the present inventive concept.

FIG. 1 is a block diagram showing a display device 100 according to embodiments of the present inventive concept.

Referring to FIG. 1, a display device 100 may include a display panel 110 and a display panel driver. The display panel driver may include a driving controller 120, a gate driver 130, a gamma reference voltage generator 140, and a data driver 150.

The display panel 110 may include a display area for displaying an image and a peripheral area disposed adjacent to the display area.

The display panel 110 may include gate lines GL, data lines DL, and pixels electrically connected to the gate lines GL and the data lines DL, respectively. The gate lines GL may extend in a first direction, the data lines DL may extend in a second direction crossing the first direction.

The driving controller 120 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, and a data signal DATA based on the input image data IMG and the input control signal CONT.

The driving controller 120 may generate the first control signal CONT1 for controlling an operation of the gate driver 130 based on the input control signal CONT, and output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and output the third control signal CONT3 to the gamma reference voltage generator 140.

The gate driver 130 may generate gate signals for driving the gate lines GL in response to the first control signal CONT1 received from the driving controller 120. The gate driver 130 may output the gate signals to the gate lines GL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

The gamma reference voltage generator 140 may be disposed in the driving controller 120 or may be disposed in the data driver 150.

The data driver 150 may receive the second control signal CONT2 and the data signal DATA from the driving controller 120, and receive the gamma reference voltage VGREF from the gamma reference voltage generator 140. The data driver 150 may convert the data signal DATA into a data voltage having an analog type using the gamma reference voltage VGREF. The data driver 150 may output the data voltage to the data line DL.

Figure 2:
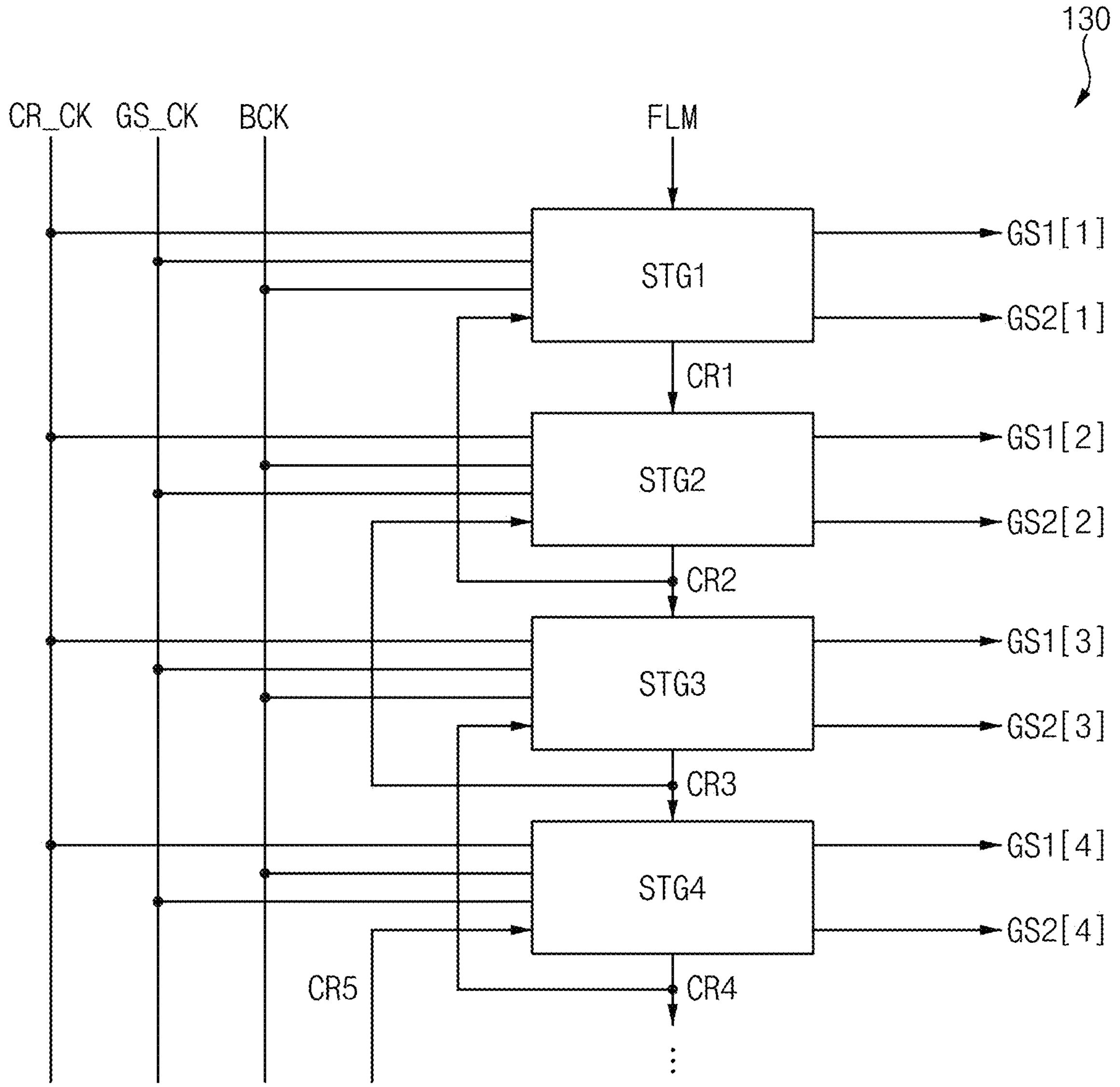
FIG. 2 is a block diagram showing a gate driver of FIG. 1.

FIG. 2 is a block diagram showing a gate driver 130 of FIG. 1.

Referring to FIG. 1 and FIG. 2, the gate driver 130 may include a plurality of stages STG1, STG2, STG3, STG4, . . . .

The stages STG1, STG2, STG3, STG4, . . . may receive gate clock signals GS_CK, carry clock signals CR_CK, and a boosting clock signals BCK. For example, the gate clock signals GS_CK may be two clock signals having different phases. For example, the carry clock signals CR_CK may be two clock signals having different phases. For example, the boosting clock signals BCK may be two clock signals having different phases. In addition, a first stage STG1 may further receive a gate start signal FLM and a second carry signal CR2. Each of subsequent stages STG2, STG3, STG3, . . . may further receive a carry signal of a previous stage (i.e., a previous carry signal) and a carry signal of a next stage (i.e., a next carry signal). However, the present inventive concept is not limited thereto.

Each of the stages STG1, STG2, STG3, STG4, . . . may sequentially output gate signals GS1[1], GS2[1], GS1[2], GS2[2], GS1[3], GS2[3], GS1[4], GS2[4], . . . . In addition, the each of the stages STG1, STG2, STG3, STG4, . . . may sequentially output carry signals CR1, CR2, CR3, CR4, . . . . However, the present inventive concept is not limited thereto.

Figure 3:
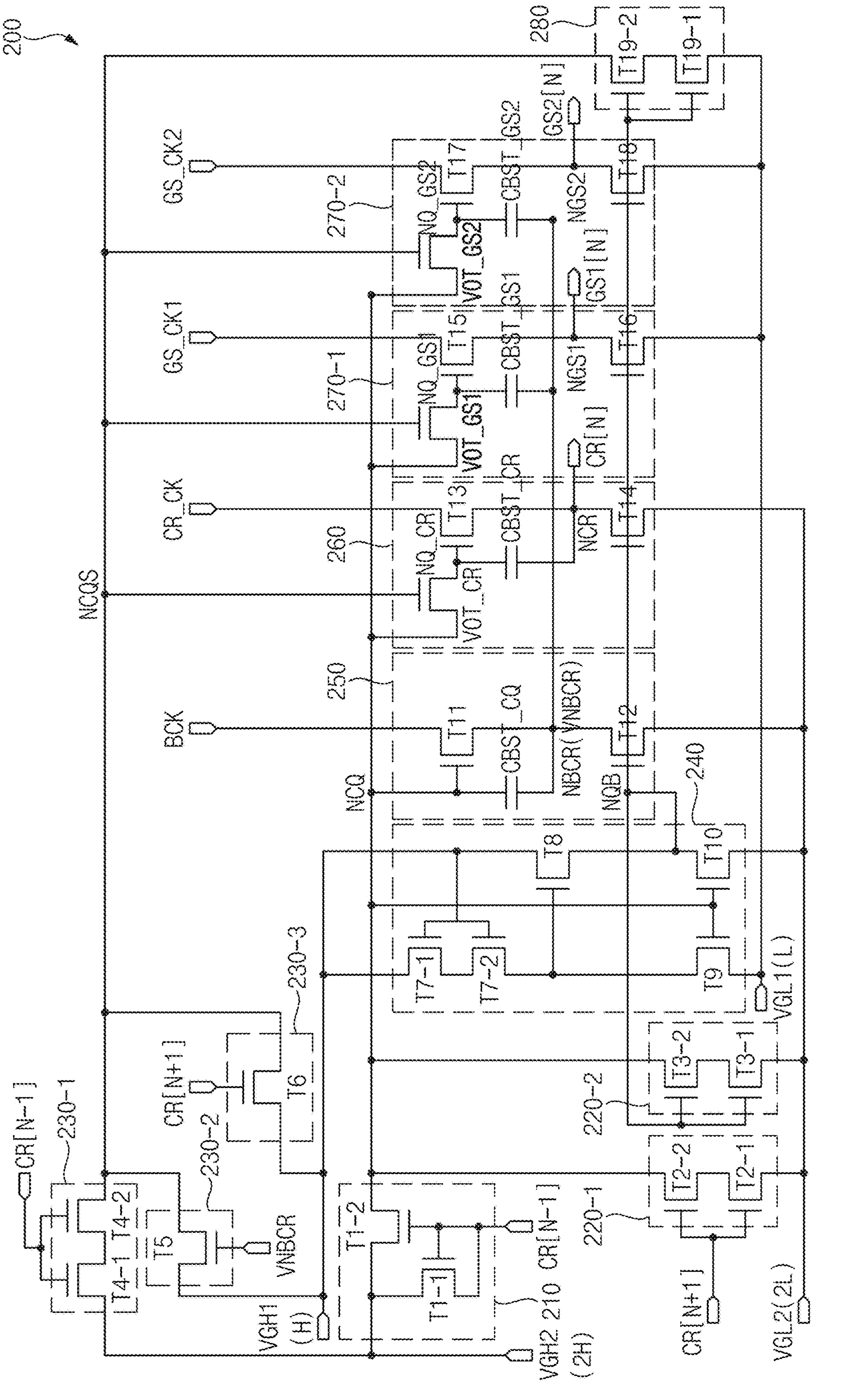
FIG. 3 is a circuit diagram showing a stage of FIG. 2.

FIG. 3 is a circuit diagram showing a stage 200 of FIG. 2.

Referring to FIGS. 1 to 3, the gate driver 130 may include a plurality of stages STG1, STG2, STG3, STG4, . . . . A stage 200 of FIG. 3 may be an N-th stage of FIG. 2. Here, N is a natural number greater than or equal to 1. The gate driver 130 may support a DLG (Dual Line Gate) mode. The DLG mode refers to a mode which increases a driving frequency of the display device 100 by simultaneously driving two consecutive gate lines. When the gate driver 130 performs the DLG mode, a period of an activation pulse of a carry signal CR[N] may be reduced in order to simultaneously drive the two consecutive gate lines. However, the present inventive concept is not limited thereto. The DLG mode may simultaneously drive three or more consecutive gate lines.

The stage 200 may include a CQ node charging circuit 210, a first CQ node charging circuit 220-1, a second CQ node charging circuit 220-2, a first CQS node charging circuit 230-1, a second CQS node charging circuit 230-2, a third CQS node charging circuit 230-3, a QB node control circuit 240, a CQ node boosting circuit 250, a carry output circuit 260, a first gate output circuit 270-1, a second gate output circuit 270-2, and a CQS node discharging circuit 280. In an embodiment, transistors included in the stage 200 may be NMOS transistors. However, the present inventive concept is not limited thereto. The transistors included in the stage 200 may be PMOS transistors. The transistors included in the stage 200 may be CMOS transistors.

The CQ node charging circuit 210 may provide a previous carry signal CR[N−1] and a second high gate voltage VGH2 to a CQ node NCQ in response to a previous carry signal CR[N−1].

The CQ node charging circuit 210 may include a first-first transistor T1-1 and a first-second transistor T1-2. The first-first transistor T1-1 may include a gate electrode receiving the previous carry signal CR[N−1], a first electrode receiving the previous carry signal CR[N−1], and a second electrode receiving a second high gate voltage VGH2. The first-second transistor T1-2 may include a gate electrode receiving the previous carry signal CR[N−1], a first electrode receiving the second high gate voltage VGH2, and a second electrode connected to the CQ node NCQ.

The first CQ node discharging circuit 220-1 may provide a second low gate voltage VGL2 to the CQ node NCQ in response to a next carry signal CR[N+1].

The first CQ node discharging circuit 220-1 may include a second transistor T2-1, T2-2. The second transistor T2-1, T2-2 may include a gate electrode receiving the next carry signal CR[N+1], a first electrode receiving the second low gate voltage VGL2, and a second electrode connected to the CQ node NCQ. In an embodiment, the second transistor T2-1, T2-2 may include a second-first transistor T2-1 and a second-second transistor T2-2 which are connected in series and whose gate electrodes are connected to each other.

The second CQ node discharging circuit 220-2 may provide the second low gate voltage VGL2 to the CQ node NCQ in response to a voltage of a QB node NQB.

The second CQ node discharging circuit 220-2 may include a third transistor T3-1, T3-2. The third transistor T3-1, T3-2 may include a gate electrode connected to a QB node NQB, a first electrode receiving the second low gate voltage VGL2, and a second electrode connected to the CQ node NCQ. In an embodiment, the third transistor T3-1, T3-2 may include a third-first transistor T3-1 and a third-second transistor T3-2 which are connected in series and whose gate electrodes are connected to each other.

The first CQS node charging circuit 230-1 may provide the second high gate voltage VGH2 to the CQS node NCQS in response to the previous carry signal CR[N−1].

The first CQS node charging circuit 230-1 may include a fourth transistor T4-1, T4-2. The fourth transistor T4-1, T4-2 may include a gate electrode receiving the previous carry signal CR[N−1], a first electrode receiving the second high gate voltage VGH2, and a second electrode connected to the CQS node NCQS. In an embodiment, the fourth transistor T4-1, T4-2 may include a fourth-first transistor T4-1 and a fourth-second transistor T4-2 which are connected in series and whose gate electrodes are connected to each other.

The second CQS node charging circuit 230-2 may provide a first high gate voltage VGL1 to the CQS node NCQS in response to a voltage VNBCR of a boosting node NBCR.

The second CQS node charging circuit 230-2 may include a fifth transistor T5. The fifth transistor T5 may include a gate electrode receiving the voltage VNBCR of the boosting node NBCR, a first electrode receiving the first high gate voltage VGH1, and a second electrode connected to the CQS node NCQS.

The third CQS node charging circuit 230-3 may provide the first high gate voltage VGH1 to the CQS node NCQS in response to the next carry signal CR[N+1].

The third CQS node charging circuit 230-3 may include a sixth transistor T6. The sixth transistor T6 may include a gate electrode receiving the next carry signal CR[N+1], a first electrode receiving the first high gate voltage VGH1, and a second electrode connected to the CQS node NCQS.

The QB node control circuit 240 may invert the voltage of the CQ node NCQ and provide the inverted voltage of the CQ node NCQ to the QB node NQB.

The QB node control circuit 240 may include a seventh transistor T7-1, T7-2, an eighth transistor T8, a ninth transistor T9, and a tenth transistor T10. The seventh transistor T7-1, T7-2 may include a gate electrode receiving the first high gate voltage VGH1, a first electrode receiving the first high gate voltage VGH1, and a second electrode. In an embodiment, the seventh transistor T7-1, T7-2 may include a seventh-first transistor T7-1 and a seventh-second transistor T7-2 which are connected in series and whose gate electrodes are connected to each other. The eighth transistor T8 may include a gate electrode connected to the second electrode of the seventh transistor T7-1, T7-2, a first electrode receiving the first high gate voltage VGH1, and a second electrode connected to the QB node NQB. The ninth transistor T9 may include a gate electrode connected to the CQ node NCQ, a first electrode receiving the first low gate voltage VGL1, and a second electrode connected to the second electrode of the seventh transistor T7-1, T7-2 and the gate electrode of the eighth transistor T8. The tenth transistor T10 may include a gate electrode connected to the CQ node NCQ, a first electrode receiving the second low gate voltage VGL2, and a second electrode connected to the QB node NQB.

The CQ node boosting circuit 250 may provide a boosting clock signal BCK to the boosting node NBCR in response to the voltage of the CQ node NCQ, and may provide the second low gate voltage VGL2 to the boosting node NBCR in response to the voltage of the QB node NQB.

The CQ node boosting circuit 250 may include an eleventh transistor T11, a twelfth transistor T12, and a CQ boost capacitor CBST_CQ. The eleventh transistor T11 may include a gate electrode connected to the CQ node NCQ, a first electrode receiving the boosting clock signal BCK, and a second electrode connected to the boosting node NBCR. The twelfth transistor T12 may include a gate electrode connected to the QB node NQB, a first electrode receiving the second low gate voltage VGL2, and a second electrode connected to the boosting node NBCR. The CQ boost capacitor CBST_CQ may include a first electrode connected to the CQ node NCQ and a second electrode connected to the boosting node NBCR.

The carry output circuit 260 may provide a carry clock signal CR_CK as a carry signal CR[N] to the carry node NCR in response to the voltage of the CQ node NCQ, and may provide the second low gate voltage VGL2 as the carry signal CR[N] to the carry node NCR in response to the voltage of the QB node NQB.

The carry output circuit 260 may include a carry variable on transistor VOT_CR, a thirteenth transistor T13, a fourteenth transistor T14, and a carry boost capacitor CBST_CR. The carry variable on transistor VOT_CR may include a gate electrode connected to the CQS node NCQS, a first electrode connected to the CQ node NCQ, and a second electrode connected to a carry Q node NQ_CR. The thirteenth transistor T13 may include a gate electrode connected to the carry Q node NQ_CR, a first electrode receiving the carry clock signal CR_CK, and a second electrode connected to the carry node NCR from which the carry signal CR[N] is output. The fourteenth transistor T14 may include a gate electrode connected to the QB node NQB, a first electrode receiving the second low gate voltage VGL2, and a second electrode connected to the carry node NCR. The boost capacitor CBST_CR may include a first electrode connected to the carry Q node NQ_CR and a second electrode connected to the carry node NCR.

The first gate output circuit 270-1 may provide a first gate clock signal GS_CK1 as a first gate signal GS1[N] to a first gate node NGS1 in response to the voltage of the CQ node NCQ, and may provide the first low gate voltage VGL1 as the first gate signal GS1[N] to the first gate node NGS1 in response to the voltage of the QB node NQB.

The first gate output circuit 270-1 may include a first gate variable on transistor VOT_GS1, a fifteenth transistor T15, a sixteenth transistor T16, and a first gate boost capacitor CBST_GS1. The first gate variable on transistor VOT_GS1 may include a gate electrode connected to the CQS node NCQS, a first electrode connected to the CQ node NCQ, and a second electrode connected to a first gate Q node NQ_GS1. The fifteenth transistor T15 may include a gate electrode connected to the first gate Q node NQ_GS1, a first electrode receiving the first gate clock signal GS_CK1, and a second electrode connected to the first gate node NGS1. The sixteenth transistor T16 may include a gate electrode connected to the QB node NQB, a first electrode receiving the first low gate voltage VGL1, and a second electrode connected to the first gate node NGS1. The first gate boost capacitor CBST_GS1 may include a first electrode connected to the first gate Q node NQ_GS1 and a second electrode connected to the boosting node NBCRR.

The second gate output circuit 270-2 may provide a second gate clock signal GS_CK2 as a second gate signal GS2[N] to a second gate node NGS2 in response to the voltage of the CQ node NCQ, and may provide the first low gate voltage VGL1 as the second gate signal GS2[N] to the second gate node NGS2 in response to the voltage of the QB node NQB.

The second gate output circuit 270-2 may include a second gate variable on transistor VOT_GS2, a seventeenth transistor T17, an eighteenth transistor T18, and a second gate boost capacitor CBST_GS2. The second gate variable on transistor VOT_GS2 may include a gate electrode connected to the CQS node NCQS, a first electrode connected to the CQ node NCQ, and a second electrode connected to a second gate Q node NQ_GS2. The seventeenth transistor T17 may include a gate electrode connected to the second gate Q node NQ_GS2, a first electrode receiving the second gate clock signal GS_CK2, and a second electrode connected to the second gate node NGS2. The eighteenth transistor T18 may include a gate electrode connected to the QB node NQB, a first electrode receiving the first low gate voltage VGL1, and a second electrode connected to the second gate node NGS2. The second gate boost capacitor CBST_GS2 may include a first electrode connected to the second gate Q node NQ_GS2 and a second electrode connected to the boosting node NBCR.

The CQS node discharging circuit 280 may provide the first low gate voltage VGL1 to the CQS node NCQS in response to the voltage of the QB node NQB.

The CQS node discharging circuit 280 may include a nineteenth transistor T19-1, T19-2. The nineteenth transistor T19-1, T19-2 may include a gate electrode connected to the QB node NQB, a first electrode receiving the first low gate voltage VGL1, and a second electrode connected to the CQS node NCQS. In an embodiment, the nineteenth transistor T19-1, T19-2 may include a nineteenth-first transistor T19-1 and a nineteenth-second transistor T19-2 which are connected in series and whose gate electrodes are connected to each other.

The first high gate voltage VGH1 may have a first high level H, and the second high gate voltage VGH2 may have a second high level 2H. The second high level 2H may be higher than the first high level H.

The first low gate voltage VGL1 may have a first low level L, and the second low gate voltage VGL2 may have a second low level 2L. The second low level 2L may be lower than the first low level L.

Figure 4:
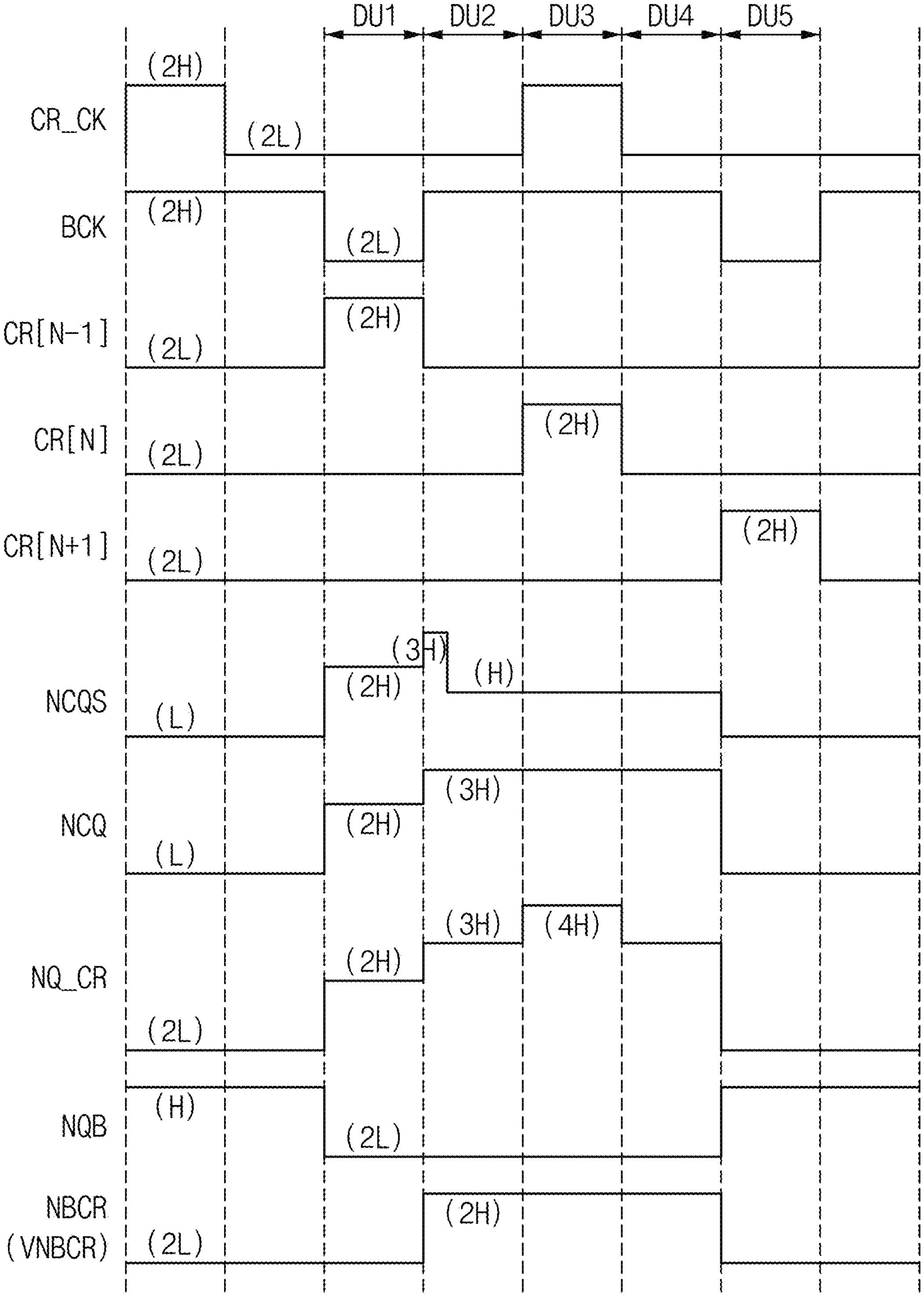
FIG. 4 is a timing diagram showing an operation of a stage of FIG. 3.
Figure 5:
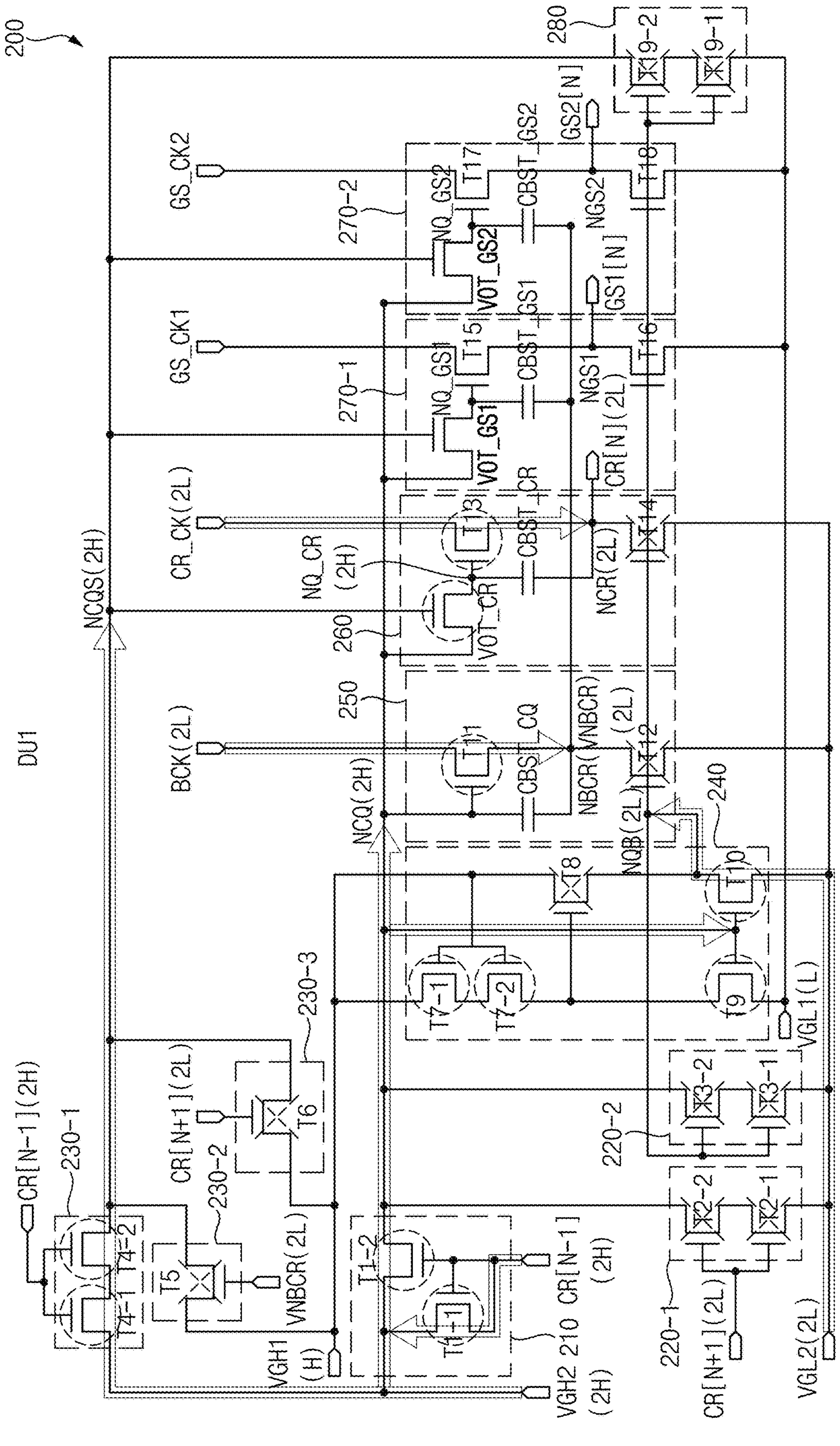
FIG. 5 is a circuit diagram showing an operation of a stage of FIG. 3 in a first duration of FIG. 4.
Figure 6:
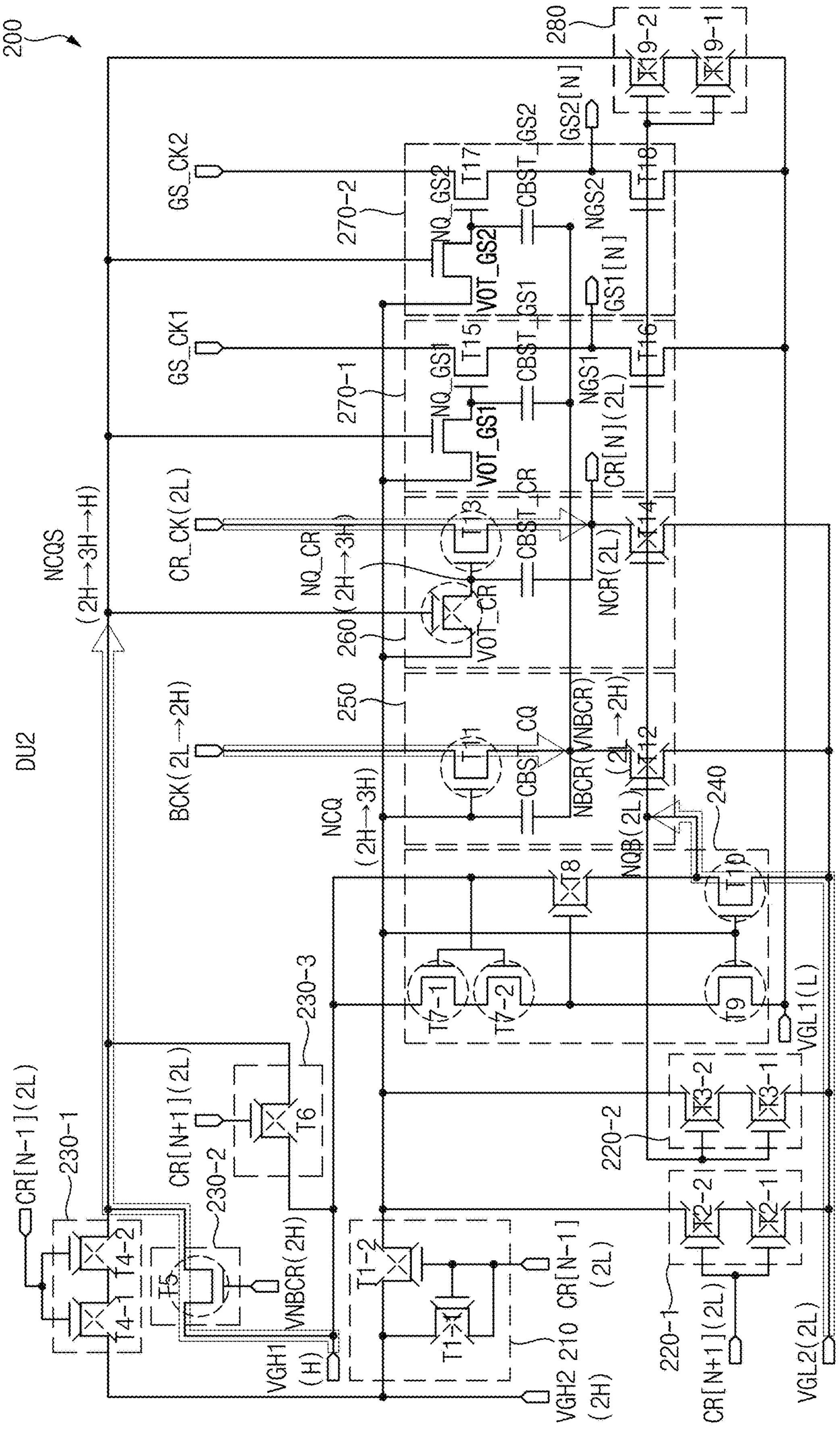
FIG. 6 is a circuit diagram showing an operation of a stage of FIG. 3 in a second duration of FIG. 4.
Figure 7:
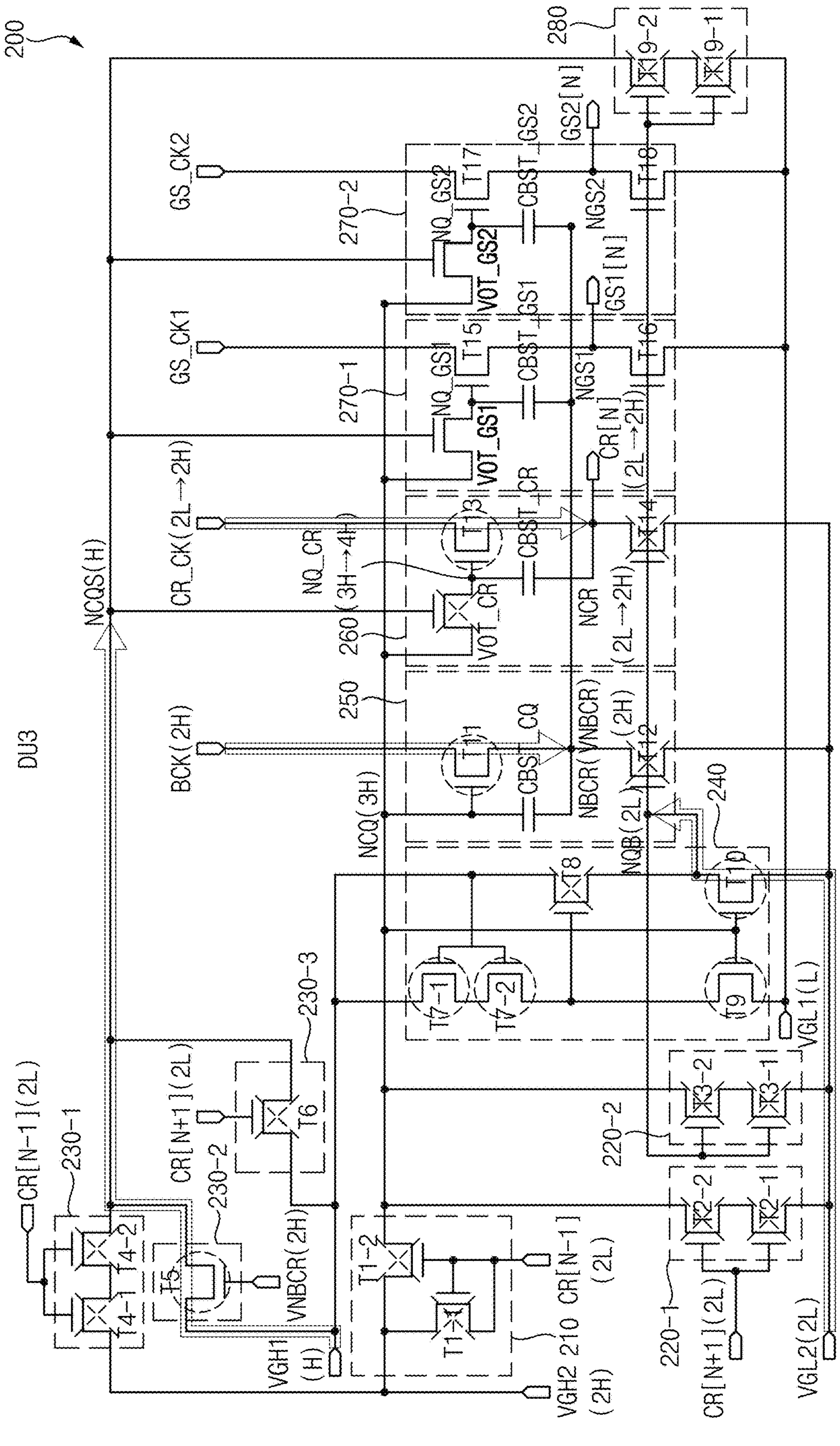
FIG. 7 is a circuit diagram showing an operation of a stage of FIG. 3 in a third duration of FIG. 4.
Figure 8:
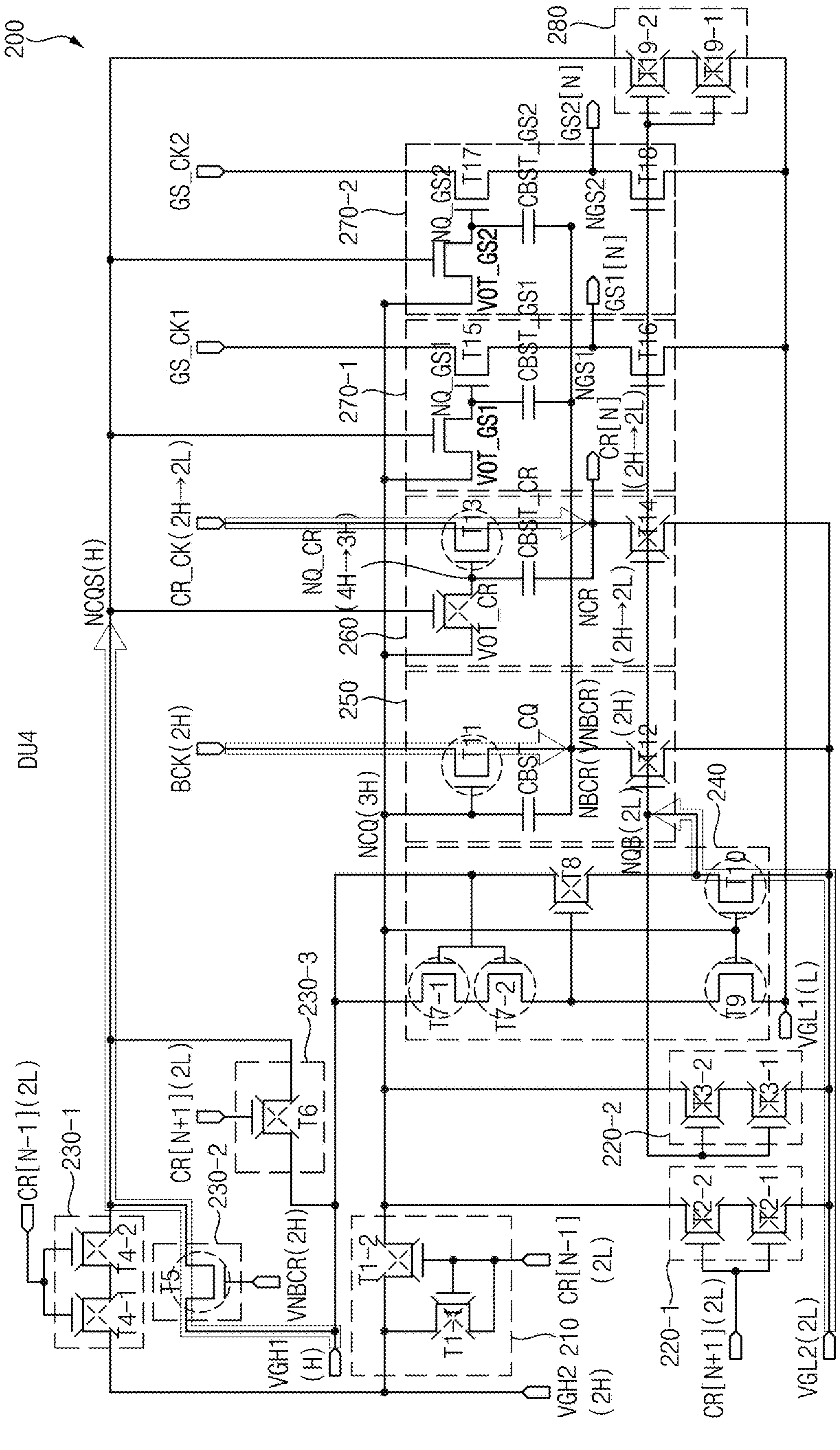
FIG. 8 is a circuit diagram showing an operation of a stage of FIG. 3 in a fourth duration of FIG. 4.
Figure 9:
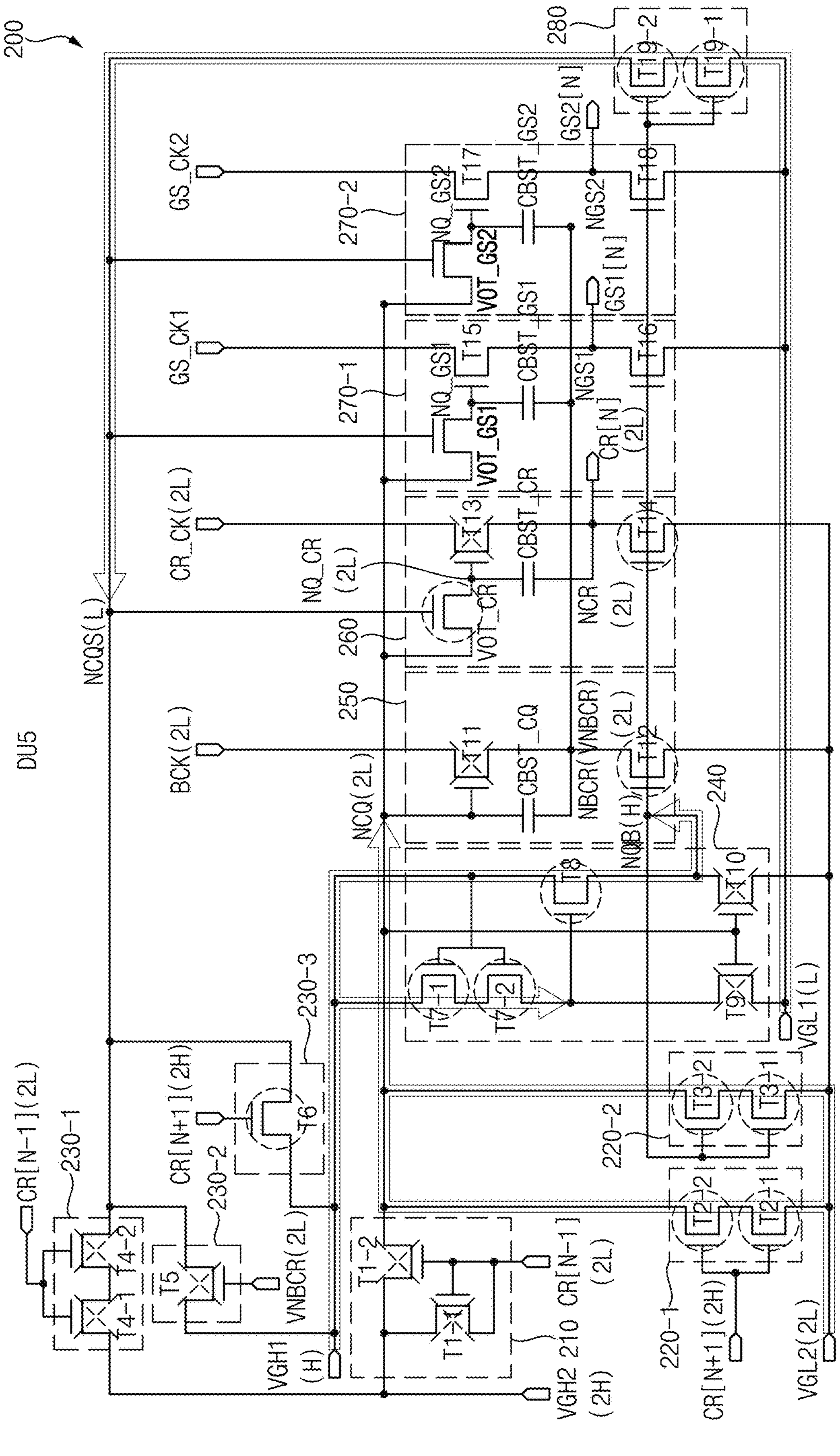
FIG. 9 is a circuit diagram showing an operation of a stage of FIG. 3 in a fifth duration of FIG. 4.

FIG. 4 is a timing diagram showing an operation of a stage 200 of FIG. 3. FIG. 5 is a circuit diagram showing an operation of a stage 200 of FIG. 3 in a first duration DU1 of FIG. 4. FIG. 6 is a circuit diagram showing an operation of a stage 200 of FIG. 3 in a second duration DU2 of FIG. 4. FIG. 7 is a circuit diagram showing an operation of a stage 200 of FIG. 3 in a third duration DU3 of FIG. 4. FIG. 8 is a circuit diagram showing an operation of a stage 200 of FIG. 3 in a fourth duration DU4 of FIG. 4. FIG. 9 is a circuit diagram showing an operation of a stage 200 of FIG. 3 in a fifth duration DU5 of FIG. 4.

Referring to FIGS. 4 and 5, in a first duration DU1, the carry clock signal CR_CK may have the second low level 2L, the boosting clock signal BCK may have the second low level 2L, the previous carry signal CR[N−1] may have the second high level 2H, and the next carry signal CR[N+1] may have the second low level 2L.

The first-first transistor T1-1 and the first-second transistor T1-2 may be turned on in response to the previous carry signal CR[N−1] having the second high level 2H. The previous carry signal CR[N−1] having the second high level 2H may be provided to the CQ node NCQ through the first-first transistor T1-1 and the first-second transistor T1-2. The second high gate voltage VGH2 may be provided to the CQ node NCQ through the first-second transistor T1-2. Therefore, the voltage of the CQ node NCQ may have the second high level 2H.

The second-first transistor T2-1 and the second-second transistor T2-2 may be turned off in response to the next carry signal CR[N+1] having the second low level 2L.

The fourth-first transistor T4-1 and the fourth-second transistor T4-2 may be turned on in response to the previous carry signal CR[N−1] having the second high level 2H to provide the second high gate voltage VGH2 to the CQS node NCQS. The sixth transistor T6 may be turned off in response to the next carry signal CR[N+1] having the second low level 2L. Therefore, the voltage of the CQS node NCQS may have the second high level 2H.

The fifth transistor T5 may be turned off in response to the voltage VNBCR of the boosting node having the second low level 2L.

The seventh-first transistor T7-1 and the seventh-second transistor T7-2 may be turned on in response to the first high gate voltage VGH1 to provide the first high gate voltage VGH1 to the gate electrode of the eighth transistor T8. The ninth transistor T9 may be turned on in response to the voltage of the CQ node NCQ having the second high level 2H to provide the first low gate voltage VGL1 to the gate electrode of the eighth transistor T8. Based on sizes of the seventh-first transistor T7-1 and the seventh-second transistor T7-2 and a size of the ninth transistor T9, a voltage of the gate electrode of the eighth transistor T8 may have the first low level L. The eighth transistor T8 may be turned off in response to the first low gate voltage VGL1 having a first low level L. The tenth transistor T10 may be turned on in response to the voltage of the CQ node NCQ having the second high level 2H to provide the second low gate voltage VGL2 to the QB node NQB. Therefore, the voltage of the QB node NQB may have the second low level 2L.

The third-first transistor T3-1 and the third-second transistor T3-2 may be turned off in response to the voltage of the QB node NQB having the second low level 2L.

The nineteenth-first transistor T19-1 and the nineteenth-second transistor T19-2 may be turned off in response to the voltage of the QB node NQB having the third low level 2L.

The eleventh transistor T11 may be turned on in response to the voltage of the CQ node NCQ having the second high level 2H and provide the boosting clock signal BCK having the second low level 2L to the boosting node NBCR. The twelfth transistor T12 may be turned off in response to the voltage of the QB node NQB having the second low level 2L. Therefore, the voltage VNBCR of the boosting node NBCR may have the second low level 2L.

Since the voltage of the CQ node NCQB has the second high level 2H and the voltage VNBCR of the boosting node NBCR has the second low level 2L, the CQ boost capacitor CBST_CQ may be charged based on the second high level 2H and the second low level 2L.

The fifth transistor T5 may be turned off in response to the voltage VNBCR of the boosting node NBCR having the second low level 2L.

The carry variable on transistor VOT_CR may be turned on in response to the voltage of the CQS node NCQS having the second high level 2H to provide the voltage of the CQ node NCQ having the second high level 2H to the carry Q node NQ_CR. Therefore, the voltage of the carry Q node NQ_CR may have the second high level 2H. The thirteenth transistor T13 may be turned on in response to the voltage of the carry Q node NQ_CR having the second high level 2H to provide the carry clock signal CR_CK having the second low level 2L to the carry node NCR. The fourteenth transistor T14 may be turned off in response to the voltage of the QB node NQB having the second low level 2L. Therefore, the voltage of the carry node NCR may have the second low level 2L, and accordingly, the carry signal CR[N] may have the second low level 2L.

Referring to FIG. 4 and FIG. 6, in a second duration DU2, the carry clock signal CR_CK may have the second low level 2L, the boosting clock signal BCK may have the second high level 2H, the previous carry signal CR[N−1] may have the second low level 2L, and the next carry signal CR[N+1] may have the second low level 2L.

The first-first transistor T1-1 and the first-second transistor T1-2 may be turned off in response to the previous carry signal CR[N−1] having the second low level 2L. The second-first transistor T2-1 and the second-second transistor T2-2 may be turned off in response to the next carry signal CR[N+1] having the second low level 2L. Therefore, the voltage of the CQ node NCQ may maintain the second high level 2H of the first duration DU1.

The fourth-first transistor T4-1 and the fourth-second transistor T4-2 may be turned off in response to the previous carry signal CR[N−1] having the second low level 2L. The sixth transistor T6 may be turned off in response to the next carry signal CR[N+1] having the second low level 2L. Therefore, the voltage of the CQS node NCQS may maintain the second high level 2H of the first duration DU1.

The seventh-first transistor T7-1 and the seventh-second transistor T7-2 may be turned on in response to the first high gate voltage VGH1 to provide the first high gate voltage VGH1 to the gate electrode of the eighth transistor T8. The ninth transistor T9 may be turned on in response to the voltage of the CQ node NCQ having the second high level 2H to provide the first low gate voltage VGL1 to the gate electrode of the eighth transistor T8. Based on the sizes of the seventh-first transistor T7-1 and the seventh-second transistor T7-2 and the size of the ninth transistor T9, the voltage of the gate electrode of the eighth transistor T8 may have the first low level L. The eighth transistor T8 may be turned off in response to the first low level L. The tenth transistor T10 may be turned on in response to the voltage of the CQ node NCQ having the second high level 2H to provide the second low gate voltage VGL2 to the QB node NQB. Therefore, the voltage of the QB node NQB may have the second low level 2L.

The third-first transistor T3-1 and the third-second transistor T3-2 may be turned off in response to the voltage of the QB node NQB having the second low level 2L.

The nineteenth-first transistor T19-1 and the nineteenth-second transistor T19-2 may be turned off in response to the voltage of the QB node NQB having the second low level 2L.

The eleventh transistor T11 may be turned on in response to the voltage of the CQ node NCQ having the second high level 2H to provide the boosting clock signal BCK having the second high level 2H to the boosting node NBCR. The twelfth transistor T12 may be turned off in response to the voltage of the QB node NQB having the second low level 2L. Since the boosting clock signal BCK changes from the second low level 2L to the second high level 2H, the voltage VNBCR of the boosting node NBCR may change from the second low level 2L to the second high level 2H.

Since the CQ boost capacitor CBST_CQ is charged based on the second high level 2H and the second low level 2L, when the voltage VNBCR of the boosting node NBCR changes from the second low level 2L to the second high level 2H, the voltage of the CQ node NCQ may be boosted from the second high level 2H to a third high level 3H by the CQ boost capacitor CBST_CQ. In this case, the voltage of the CQS node NCQS may also be affected by the CQ boost capacitor CBST_CQ, and the voltage of the CQS node NCQS may be changed from the second high level 2H to a third high level 3H. The third high level 3H may be higher than the second high level 2H.

Since the voltage of the CQS node NCQS has the third high level 3H and the voltage of the CQ node NCQ is the third high level 3H, the carry variable on transistor VOT_CR may be turned on. The voltage of the CQ node NCQ having the third high level 3H may be provided to the carry Q node NQ_CR through the carry variable on transistor VOT_CR. Therefore, the voltage of the carry Q node NQ_CR may have the third high level 3H.

The thirteenth transistor T13 may be turned on in response to the voltage of the carry Q node NQ_CR having the third high level 3H to provide the carry clock signal CR_CK having the second low level 2L to the carry node NCR. The fourteenth transistor T14 may be turned off in response to the voltage of the QB node NQB having the second low level 2L. Therefore, the voltage of the carry node NCR may have the second low level 2L, and accordingly, the carry signal CR[N] may have the second low level 2L.

Since the voltage of the carry Q node NQ_CR has the third high level 3H and the voltage of the carry node NCR has the second low level 2L, the carry boost capacitor CBST_CR may be charged based on the third high level 3H and the second low level 2L.

The fifth transistor T5 may be turned on in response to the voltage VNBCR of the boosting node NBCR having the second high level 2H to provide the first high gate voltage VGH1 to the CQS node NCQS. Therefore, the voltage of the CQS node NCQS may be changed from the third high level 3H to the first high level H.

Since the voltage of the CQS node NCQS has the first high level H and the voltage of the CQ node NCQ is the third high level 3H, the carry variable on transistor VOT_CR may be turned off.

Referring to FIG. 4 and FIG. 7, in a third duration DU3, the carry clock signal CR_CK may have the second high level 2H, the boosting clock signal BCK may have the second high level 2H, the previous carry signal CR[N−1] may have the second low level 2L, and the next carry signal CR[N+1] may have the second low level 2L.

The first-first transistor T1-1 and the first-second transistor T1-2 may be turned off in response to the previous carry signal CR[N−1] having the second low level 2L. The second-first transistor T2-1 and the second-second transistor T2-2 may be turned off in response to the next carry signal CR[N+1] having the second low level 2L. Therefore, the voltage of the CQ node NCQ may maintain the third high level 3H of the second duration DU2.

The fourth-first transistor T4-1 and the fourth-second transistor T4-2 may be turned off in response to the previous carry signal CR[N−1] having the second low level 2L. The sixth transistor T6 may be turned off in response to the next carry signal CR[N+1] having the second low level 2L.

The seventh-first transistor T7-1 and the seventh-second transistor T7-2 may be turned on in response to the first high gate voltage VGH1 to provide the first high gate voltage VGH1 to the gate electrode of the eighth transistor T8. The ninth transistor T9 may be turned on in response to the voltage of the CQ node NCQ having the third high level 3H to provide the first low gate voltage VGL1 to the gate electrode of the eighth transistor T8. Based on the sizes of the seventh-first transistor T7-1 and the seventh-second transistor T7-2 and the size of the ninth transistor T9, the voltage of the gate electrode of the eighth transistor T8 may have the first low level L. The eighth transistor T8 may be turned off in response to the first low level L. The tenth transistor T10 may be turned on in response to the voltage of the CQ node NCQ having the third high level 3H to provide the second low gate voltage VGL2 to the QB node NQB. Therefore, the voltage of the QB node NQB may have the second low level 2L.

The third-first transistor T3-1 and the third-second transistor T3-2 may be turned off in response to the voltage of the QB node NQB having the second low level 2L.

The nineteenth-first transistor T19-1 and the nineteenth-second transistor T19-2 may be turned off in response to the voltage of the QB node NQB having the second low level 2L.

The eleventh transistor T11 may be turned on in response to the voltage of the CQ node NCQ having the third high level 3H to provide the boosting clock signal BCK having the second high level 2H to the boosting node NBCR. The twelfth transistor T12 may be turned off in response to the voltage of the QB node NQB having the second low level 2L. Therefore, the voltage VNBCR of the boosting node NBCR may have the second high level 2H.

The fifth transistor T5 may be turned on in response to the voltage VNBCR of the boosting node NBCR having the second high level 2H to provide the first high gate voltage VGH1 to the CQS node NCQS. Therefore, the voltage of the CQS node NCQS may have the first high level H.

Since the voltage of the CQS node NCQS has the first high level H and the voltage of the CQ node NCQ has the third high level 3H, the carry variable on transistor VOT_CR may be turned off.

The thirteenth transistor T13 may be turned on in response to the voltage of the carry Q node NQ_CR having the third high level 3H to provide the carry clock signal CR_CK having the second high level 2H to the carry node NCR. The fourteenth transistor T14 may be turned off in response to the voltage of the QB node NQB having the second low level 2L. Since the carry clock signal CR_CK changes from the second low level 2L to the second high level 2H, the voltage of the carry node NCR of the boosting node NBCR may change from the second low level 2L to the second high level 2H, and accordingly, the carry signal CR[N] may change from the second low level 2L to the second high level 2H.

Since the carry boost capacitor CBST_CR is charged based on the third high level 3H and the second low level 2L, when the voltage of the carry node NCR changes from the second low level 2L to the second high level 2H, the voltage of the carry Q node NQ_CR may be boosted from the third high level 3H to a fourth high level 4H by the carry boost capacitor CBST_CR. The fourth high level 4H may be higher than the third high level 3H. Therefore, the thirteenth transistor T13 may be fully turned on for a short time.

As such, even if the gate driver 130 performs the DLG mode and the period of the activation pulse (e.g., a pulse having the second high level 2H) of the carry clock signal CR_CK is shortened, the voltage of the carry Q node NQ_CR may be boosted by the carry boost capacitor CBST. In addition, since the carry variable on transistor VOT_CR is turned off, the boosted voltage of the carry Q node NQ_CR may not be affected by the voltage of the CQ node NCQ having the third high level 3H.

Since the voltage of the carry Q node NQ_CR has the fourth high level 4H and the voltage of the carry node NCR has the second high level 2H, the carry boost capacitor CBST_CR may be charged based on the fourth high level 4H and the second high level 2H.

Referring to FIG. 4 and FIG. 8, in a fourth duration DU4, the carry clock signal CR_CK may have the second low level 2L, the boosting clock signal BCK may have the second high level 2H, the previous carry signal CR[N−1] may have the second low level 2L, and the next carry signal CR[N+1] may have the second low level 2L.

The first-first transistor T1-1 and the first-second transistor T1-2 may be turned off in response to the previous carry signal CR[N−1] having the second low level 2L. The second-first transistor T2-1 and the second-second transistor T2-2 may be turned off in response to the next carry signal CR[N+1] having the second low level 2L. Therefore, the voltage of the CQ node NCQ may maintain the third high level 3H of the third duration DU3.

The fourth-first transistor T4-1 and the fourth-second transistor T4-2 may be turned off in response to the previous carry signal CR[N−1] having the second low level 2L. The sixth transistor T6 may be turned off in response to the next carry signal CR[N+1] having the second low level 2L.

The seventh-first transistor T7-1 and the seventh-second transistor T7-2 may be turned on in response to the first high gate voltage VGH1 to provide the first high gate voltage VGH1 to the gate electrode of the eighth transistor T8. The ninth transistor T9 may be turned on in response to the voltage of the CQ node NCQ having the third high level 3H to provide the first low gate voltage VGL1 to the gate electrode of the eighth transistor T8. Based on the sizes of the seventh-first transistor T7-1 and the seventh-second transistor T7-2 and the size of the ninth transistor T9, the voltage of the gate electrode of the eighth transistor T8 may have the first low level L. The eighth transistor T8 may be turned off in response to the first low level L. The tenth transistor T10 may be turned on in response to the voltage of the CQ node NCQ having the third high level 3H to provide the second low gate voltage VGL2 to the QB node NQB. Therefore, the voltage of the QB node NQB may have the second low level 2L.

The third-first transistor T3-1 and the third-second transistor T3-2 may be turned off in response to the voltage of the QB node NQB having the second low level 2L.

The nineteenth-first transistor T19-1 and the nineteenth-second transistor T19-2 may be turned off in response to the voltage of the QB node NQB having the third low level 2L.

The eleventh transistor T11 may be turned on in response to the voltage of the CQ node NCQ having the third high level 3H to provide the boosting clock signal BCK having the second high level 2H to the boosting node NBCR. The twelfth transistor T12 may be turned off in response to the voltage of the QB node NQB having the second low level 2L. Therefore, the voltage VNBCR of the boosting node NBCR may have the second high level 2H.

The fifth transistor T5 may be turned on in response to the voltage VNBCR of the boosting node NBCR having the second high level 2H to provide the first high gate voltage VGH1 to the CQS node NCQS. Therefore, the voltage of the CQS node NCQS may have the first high level H.

Since the voltage of the CQS node NCQS has the first high level H and the voltage of the CQ node NCQ has the third high level 3H, the carry variable on transistor VOT_CR may be turned off.

The thirteenth transistor T13 may be turned on in response to the voltage of the carry Q node NQ_CR having the fourth high level 4H to provide the carry clock signal CR_CK having the second low level 2L to the carry node NCR. The fourteenth transistor T14 may be turned off in response to the voltage of the QB node NQB having the second low level 2L. Since the carry clock signal CR_CK changes from the second high level 2H to the second low level 2L, the voltage of the carry node NCR of the boosting node NBCR may change from the second high level 2H to the second low level 2L, and accordingly, the carry signal CR[N] may change from the second high level 2H to the second low level 2L.

Since the carry boost capacitor CBST_CR is charged based on the fourth high level 4H and the second high level 2H, when the voltage of the carry node NCR changes from the second high level 2H to the second low level 2L, the voltage of the carry Q node NQ_CR may be boosted from the fourth high level 4H to the third high level 3H by the carry boost capacitor CBST_CR.

Referring to FIG. 4 and FIG. 9, in a fifth duration DU5, the carry clock signal CR_CK may have the second low level 2L, the boosting clock signal BCK may have the second low level 2L, the previous carry signal CR[N−1] may have the second low level 2L, and the next carry signal CR[N+1] may have the second high level 2H.

The first-first transistor T1-1 and the first-second transistor T1-2 may be turned off in response to the previous carry signal CR[N−1] having the second low level 2L. The second-first transistor T2-1 and the second-second transistor T2-2 may be turned on in response to the next carry signal CR[N+1] having the second high level 2H to provide the second high gate voltage VGL2 to the CQ node NCQ. Therefore, the voltage of the CQ node NCQ may have the second low level 2L.

The ninth transistor T9 and the tenth transistor T10 may be turned off in response to the voltage of the CQ node NCQ having the second low level 2L. The seventh-first transistor T7-1 and the seventh-second transistor T7-2 may be turned on in response to the first high gate voltage VGH1 to provide the first high gate voltage VGH1 to the gate electrode of the eighth transistor T8. Therefore, the voltage of the gate electrode of the eighth transistor T8 may have the first high level H. The eighth transistor T8 may be turned on in response to the first high level H to provide the first high gate voltage VGH1 to the QB node NQB. Therefore, the voltage of the QB node NQB may have the first high level H.

The third-first transistor T3-1 and the third-second transistor T3-2 may be turned on in response to the voltage of the QB node NQB having the first high level H to provide the second low gate voltage VGL2 to the CQ node NCQ. Therefore, the voltage of the CQ node NCQ may have the second low level 2L.

The eleventh transistor T11 may be turned off in response to the voltage of the CQ node NCQ having the second low level 2L. The twelfth transistor T12 may be turned on in response to the voltage of the QB node NQB having the first high level H to provide the second low gate voltage VGL2 to the boosting node NBCR. Therefore, the voltage VNBCR of the boosting node NBCR may have the second low level 2L.

The fifth transistor T5 may be turned off in response to the voltage VNBCR of the boosting node NBCR having the second low level 2L.

The nineteenth-first transistor T19-1 and the nineteenth-second transistor T19-2 may be turned on in response to the voltage of the QB node NQB having the first high level H to provide the first low gate voltage VGL1 to the CQS node NCQS. Therefore, the voltage of the CQS node NCQS may have the first low level L.

Since the voltage of the CQS node NCQS has the first low level L and the voltage of the CQ node NCQ has the second low level 2L, the carry variable on transistor VOT_CR may be turned on. The voltage of the CQ node NCQ having the second low level 2L may be provided to the carry Q node NQ_CR. Therefore, the voltage of the carry Q node NQ_CR may have the second low level 2L.

As such, even if the gate driver 130 performs the DLG mode and the period of the activation pulse (e.g., a pulse having the second high level 2H) of the carry clock signal CR_CK is shortened, the voltage of the carry Q node NQ_CR may be boosted by the carry boost capacitor CBST. In addition, since the carry variable on transistor VOT_CR is turned off, the boosted voltage of the carry Q node NQ_CR may not be affected by the voltage of the CQ node NCQ having the third high level 3H. Accordingly, the display quality may be improved.

Figure 10:
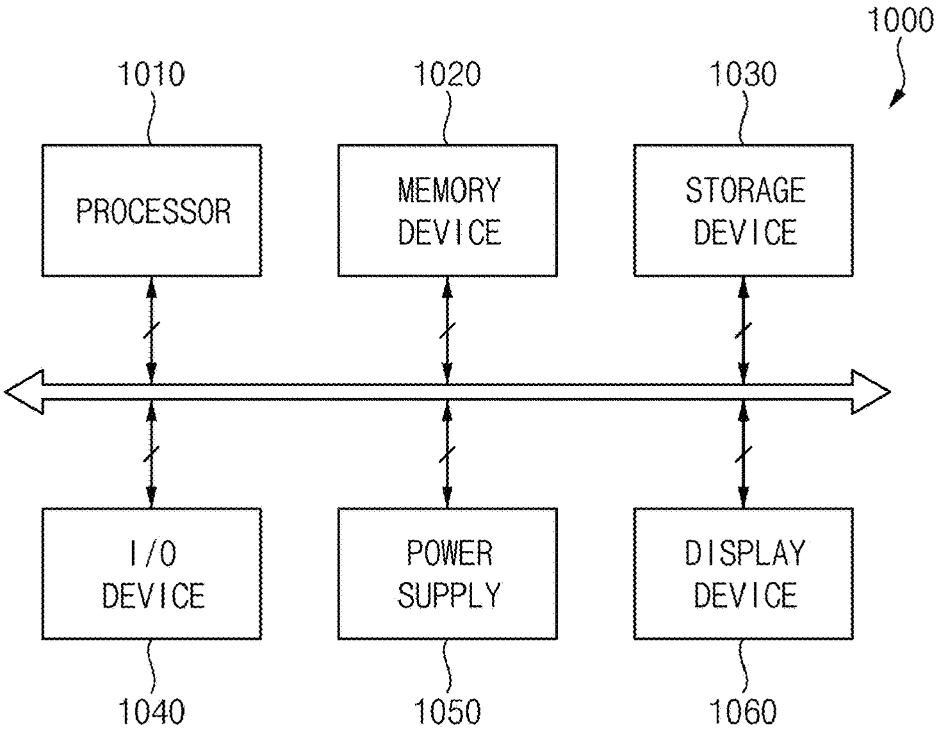
FIG. 10 is a block diagram showing an electronic device.
Figure 11:
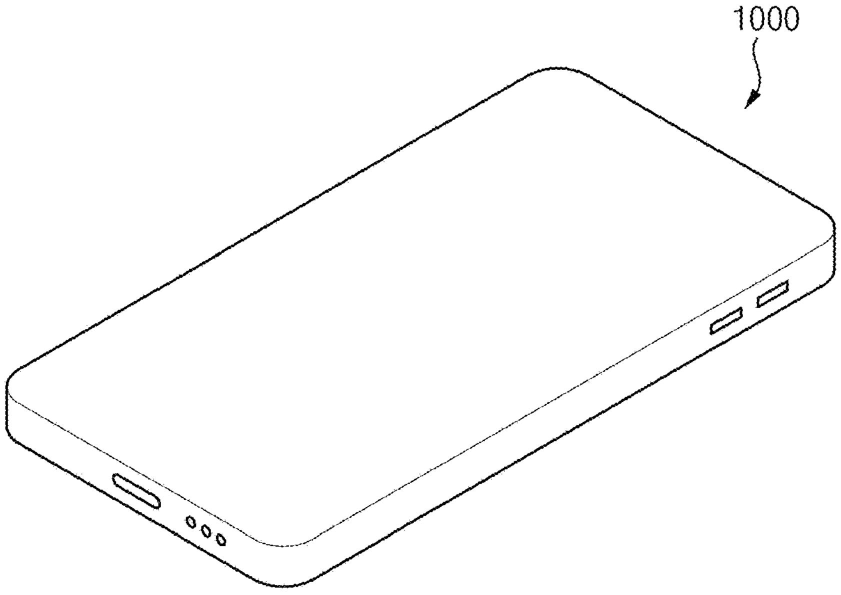
FIG. 11 is a diagram showing an embodiment in which an electronic device of FIG. 10 is implemented as a smart phone.

FIG. 10 is a block diagram showing an electronic device 1000. FIG. 11 is a diagram showing an embodiment in which an electronic device 1000 of FIG. 10 is implemented as a smart phone.

Referring to FIGS. 10 and 11, the electronic device 1000 may include a processor 1010, a memory device 1020, a storage device 1030, an input/output I/O device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus USB device, other electronic device, and the like.

In an embodiment, as shown in FIG. 11, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro-processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A gate driver including a plurality of stages, wherein each of the stages comprises:

a CQ node charging circuit configured to provide a previous carry signal and a second high gate voltage to a CQ node in response to the previous carry signal;

a first CQS node charging circuit configured to provide the second high gate voltage to a CQS node in response to the previous carry signal;

a second CQS node charging circuit configured to provide a first high gate voltage to the CQS node in response to a voltage of a boosting node;

a QB node control circuit configured to invert a voltage of the CQ node and to provide the inverted voltage of the CQ node to a QB node;

a CQ node boosting circuit configured to provide a boosting clock signal to the boosting node in response to the voltage of the CQ node and to provide a second low gate voltage to the boosting node in response to a voltage of the QB node; and a carry output circuit configured to provide a carry clock signal as the carry signal to a carry node in response to the voltage of the CQ node, and to provide the second low gate voltage as the carry signal to the carry node in response to the voltage of the QB node, wherein the carry output circuit comprises:

a carry variable on transistor including a gate electrode connected to the CQS node, a first electrode connected to the CQ node, and a second electrode connected to a carry Q node;

a thirteenth transistor including a gate electrode connected to the carry Q node, a first electrode receiving the carry clock signal, and a second electrode connected to the carry node;

a fourteenth transistor including a gate electrode connected to the QB node, a first electrode receiving the second low gate voltage, and a second electrode connected to the carry node; and a carry boost capacitor including a first electrode connected to the carry Q node and a second electrode connected to the carry node.

2. The gate driver of claim 1, wherein the carry variable on transistor is turned off when a voltage of the carry Q node is boosted by the carry boost capacitor.

3. The gate driver of claim 1, wherein the gate driver is configured to support a DLG (Dual Line Gate) mode, and a period of an activation pulse of the carry clock signal decreases while the gate driver is configured to perform the DLG mode.

4. The gate driver of claim 1, wherein the CQ node charging circuit comprises:

a first-first transistor including a gate electrode receiving the previous carry signal, a first electrode receiving the previous carry signal, and a second electrode receiving the second high gate voltage; and a first-second transistor including a gate electrode receiving the previous carry signal, a first electrode receiving the second high gate voltage, and a second electrode connected to the CQ node.

5. The gate driver of claim 1, wherein the first CQS node charging circuit comprises:

a fourth transistor including a gate electrode receiving the previous carry signal, a first electrode receiving the second high gate voltage, and a second electrode connected to the CQS node, and wherein the second CQS node charging circuit comprises:

a fifth transistor including a gate electrode receiving the voltage of the boosting node, a first electrode receiving the first high gate voltage, and a second electrode connected to the CQS node.

6. The gate driver of claim 1, wherein the QB node control circuit comprises:

a seventh transistor including a gate electrode receiving the first high gate voltage, a first electrode receiving the first high gate voltage, and a second electrode;

an eighth transistor including a gate electrode connected to the second electrode of the seventh transistor, a first electrode receiving the first high gate voltage, and a second electrode connected to the QB node;

a ninth transistor including a gate electrode connected to the CQ node, a first electrode receiving a first low gate voltage, and a second electrode connected to the second electrode of the seventh transistor and the gate electrode of the eighth transistor; and a tenth transistor including a gate electrode connected to the CQ node, a first electrode receiving the second low gate voltage, and a second electrode connected to the QB node.

7. The gate driver of claim 1, wherein the CQ node boosting circuit comprises:

an eleventh transistor including a gate electrode connected to the CQ node, a first electrode receiving the boosting clock signal, and a second electrode connected to the boosting node;

a twelfth transistor including a gate electrode connected to the QB node, a first electrode receiving the second low gate voltage, and a second electrode connected to the boosting node; and a CQ boost capacitor including a first electrode connected to the CQ node and a second electrode connected to the boosting node.

8. The gate driver of claim 1, wherein the each of the stages further comprises:

a first gate output circuit configured to provide a first gate clock signal as a first gate signal to a first gate node in response to the voltage of the CQ node, and to provide a first low gate voltage as the first gate signal to the first gate node in response to the voltage of the QB node; and a second gate output circuit configured to provide a second gate clock signal as a second gate signal to a second gate node in response to the voltage of the CQ node, and to provide the first low gate voltage as the second gate signal to the second gate node in response to the voltage of the QB node.

9. The gate driver of claim 8, wherein the first gate output circuit comprises:

a first gate variable on transistor including a gate electrode connected to the CQS node, a first electrode connected to the CQ node, and a second electrode connected to a first gate Q node;

a fifteenth transistor including a gate electrode connected to the first gate Q node, a first electrode receiving the first gate clock signal, and a second electrode connected to the first gate node;

a sixteenth transistor including a gate electrode connected to the QB node, a first electrode receiving the first low gate voltage, and a second electrode connected to the first gate node; and a first gate boost capacitor including a first electrode connected to the first gate Q node and a second electrode connected to the boosting node; and wherein the second gate output circuit comprises:

a second gate variable on transistor including a gate electrode connected to the CQS node, a first electrode connected to the CQ node, and a second electrode connected to a second gate Q node;

a seventeenth transistor including a gate electrode connected to the second gate Q node, a first electrode receiving the second gate clock signal, and a second electrode connected to the second gate node;

an eighteenth transistor including a gate electrode connected to the QB node, a first electrode receiving the first low gate voltage, and a second electrode connected to the second gate node; and a second gate boost capacitor including a first electrode connected to the second gate Q node and a second electrode connected to the boosting node.

10. The gate driver of claim 1, wherein the each of the stages further comprises:

a first CQ node discharging circuit configured to provide the second low gate voltage to the CQ node in response to a next carry signal; and a second CQ node discharging circuit configured to provide the second low gate voltage to the CQ node in response to the voltage of the QB node.

11. The gate driver of claim 10, wherein the first CQ node discharging circuit comprises:

a second transistor including a gate electrode receiving the next carry signal, a first electrode receiving the second low gate voltage, and a second electrode connected to the CQ node, and wherein the second CQ node discharging circuit comprises:

a third transistor including a gate electrode connected to the QB node, a first electrode receiving the second low gate voltage, and a second electrode connected to the CQ node.

12. The gate driver of claim 1, wherein the each of the stages further comprises:

a third CQS node charging circuit configured to provide the first high gate voltage to the CQS node in response to a next carry signal.

13. The gate driver of claim 12, wherein the third CQS node charging circuit comprises:

a sixth transistor including a gate electrode receiving the next carry signal, a first electrode receiving the first high gate voltage, and a second electrode connected to the CQS node.

14. The gate driver of claim 1, wherein the each of the stages further comprises:

a CQS node discharging circuit configured to provide a first low gate voltage to the CQS node in response to the voltage of the QB node.

15. The gate driver of claim 14, wherein the CQS node discharging circuit comprises:

a nineteenth transistor including a gate electrode connected to the QB node, a first electrode receiving the first low gate voltage, and a second electrode connected to the CQS node.

16. A display device, comprising:

a display panel including a pixel;

a data driver configured to provide a data voltage to the pixel;

a gate driver configured to provide a gate signal to the pixel; and a driving controller configured to control the data driver and the gate driver, wherein the gate driver comprises a plurality of stages, wherein each of the stages comprises:

a CQ node charging circuit configured to provide a previous carry signal and a second high gate voltage to a CQ node in response to the previous carry signal;

a first CQS node charging circuit configured to provide the second high gate voltage to a CQS node in response to the previous carry signal;

a second CQS node charging circuit configured to provide a first high gate voltage to the CQS node in response to a voltage of a boosting node;

a QB node control circuit configured to invert a voltage of the CQ node and to provide the inverted voltage of the CQ node to a QB node;

a CQ node boosting circuit configured to provide a boosting clock signal to the boosting node in response to the voltage of the CQ node and to provide a second low gate voltage to the boosting node in response to a voltage of the QB node; and a carry output circuit configured to provide a carry clock signal as the carry signal to a carry node in response to the voltage of the CQ node, and to provide the second low gate voltage as the carry signal to the carry node in response to the voltage of the QB node, and wherein the carry output circuit comprises:

a carry variable on transistor including a gate electrode connected to the CQS node, a first electrode connected to the CQ node, and a second electrode connected to a carry Q node;

a thirteenth transistor including a gate electrode connected to the carry Q node, a first electrode receiving the carry clock signal, and a second electrode connected to the carry node;

a fourteenth transistor including a gate electrode connected to the QB node, a first electrode receiving the second low gate voltage, and a second electrode connected to the carry node; and a carry boost capacitor including a first electrode connected to the carry Q node and a second electrode connected to the carry node.

17. The display device of claim 16, wherein the carry variable on transistor is turned off when a voltage of the carry Q node is boosted by the carry boost capacitor.

18. The display device of claim 16, wherein the gate driver is configured to support a DLG (Dual Line Gate) mode, and a period of an activation pulse of the carry clock signal decreases while the gate driver is configured to perform the DLG mode.

19. The display device of claim 16, wherein the CQ node charging circuit comprises:

a first-first transistor including a gate electrode receiving the previous carry signal, a first electrode receiving the previous carry signal, and a second electrode receiving the second high gate voltage; and a first-second transistor including a gate electrode receiving the previous carry signal, a first electrode receiving the second high gate voltage, and a second electrode connected to the CQ node.

20. An electronic device, comprising:

a display panel including a pixel;

a data driver configured to provide a data voltage to the pixel;

a gate driver configured to provide a gate signal to the pixel;

a driving controller configured to control the data driver and the gate driver; and a processor configured to control the driving controller, wherein the gate driver comprises a plurality of stages, wherein each of the stages comprises:

a CQ node charging circuit configured to provide a previous carry signal and a second high gate voltage to a CQ node in response to the previous carry signal;

a first CQS node charging circuit configured to provide the second high gate voltage to a CQS node in response to the previous carry signal;

a second CQS node charging circuit configured to provide a first high gate voltage to the CQS node in response to a voltage of a boosting node;

a QB node control circuit configured to invert a voltage of the CQ node and to provide the inverted voltage of the CQ node to a QB node;

a CQ node boosting circuit configured to provide a boosting clock signal to the boosting node in response to the voltage of the CQ node and to provide a second low gate voltage to the boosting node in response to a voltage of the QB node; and a carry output circuit configured to provide a carry clock signal as the carry signal to a carry node in response to the voltage of the CQ node, and to provide the second low gate voltage as the carry signal to the carry node in response to the voltage of the QB node, and wherein the carry output circuit comprises:

a carry variable on transistor including a gate electrode connected to the CQS node, a first electrode connected to the CQ node, and a second electrode connected to a carry Q node;

a thirteenth transistor including a gate electrode connected to the carry Q node, a first electrode receiving the carry clock signal, and a second electrode connected to the carry node;

a fourteenth transistor including a gate electrode connected to the QB node, a first electrode receiving the second low gate voltage, and a second electrode connected to the carry node; and a carry boost capacitor including a first electrode connected to the carry Q node and a second electrode connected to the carry node.

* * * * *